(12) United States Patent
Clapp, Jr. et al.

(10) Patent No.: US 6,434,313 B1
(45) Date of Patent: Aug. 13, 2002

(54) FIBER OPTIC CLOSURE WITH COUPLERS AND SPLICE TRAY

(75) Inventors: Donnie R. Clapp, Jr., Saginaw; Kevin L. Strause, Keller; Kelly J. Smith, Aledo; Manuel A. Torres, Haltom City, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/702,627

(22) Filed: Oct. 31, 2000

(51) Int. Cl.[7] .............................. G02B 6/00; G02B 6/36
(52) U.S. Cl. ...................... 385/135; 385/134; 385/137
(58) Field of Search ............................... 385/134, 135, 385/137

(56) References Cited

U.S. PATENT DOCUMENTS

| | | | |
|---|---|---|---|
| 5,323,480 A | | 6/1994 | Mullaney et al. ............ 385/135 |
| 5,383,051 A | * | 1/1995 | Delrosso et al. .......... 359/341.1 |
| 5,420,956 A | * | 5/1995 | Grugel et al. ................ 385/135 |
| 5,553,183 A | * | 9/1996 | Bechamps .................... 385/95 |
| 5,602,954 A | | 2/1997 | Nolf et al. ................... 385/135 |
| 5,751,882 A | * | 5/1998 | Daems et al. ................ 385/135 |
| 5,884,003 A | * | 3/1999 | Cloud et al. ................. 385/135 |
| 6,009,225 A | * | 12/1999 | Ray et al. .................... 385/135 |
| 6,269,212 B1 | * | 7/2001 | Schiattone ................... 385/135 |
| 6,275,641 B1 | * | 8/2001 | Daoud ......................... 385/135 |
| 6,292,614 B1 | * | 9/2001 | Smith et al. ................. 385/135 |

\* cited by examiner

Primary Examiner—Brian Sircus
Assistant Examiner—Michael C. Zarroli

(57) ABSTRACT

A splice closure has a frame with an end cap on one end, the end cap having apertures for the passage of express cables and drop cables. Coupler cassettes are carried by the frame in a coupler cassette subassembly. Each coupler cassette houses a plurality of couplers. The coupler cassettes are interconnected such that a single input optical fiber entering the coupler cassette subassembly results in multiple output optical fibers leaving the coupler cassette subassembly. A splice organizer comprising a plurality of splice holders is carried by the frame exterior and adjacent to the coupler cassette subassembly for retaining splices to and from the coupler cassettes. A housing encloses the frame, coupler cassette subassembly and splice organizer. An optical fiber storage tray is located adjacent the splice organizer for storing any excess express or drop cable optical fibers that are not spliced to any of the output optical fibers of the coupler cassette subassembly.

20 Claims, 6 Drawing Sheets

FIBER OPTIC CLOSURE WITH COUPLERS AND SPLICE TRAY

FIELD OF THE INVENTION

The invention relates generally to fiber optic splice closures, and in particular to a fiber optic splice closure that includes a frame for receiving couplers and a splice organizer on the same splice tray.

BACKGROUND OF THE INVENTION

Fiber optic data and communication systems employ splice closures at various points along a distribution network. A typical splice closure will be used to connect drop cables to an express cable. The drop cables may lead to individual businesses or dwellings. The splice closure has a frame with an end cap on one or both ends. The frame has provisions for receiving splice trays and storing slack fiber optic cable. The express cable typically has a jacket surrounding a number of buffer or express tubes. Each express tube has a plurality of optical fibers, normally from six to about twelve. The jacket of the express cable will be stripped off and sealed around an aperture in the end cap. Some of the express tubes will be cut and extend between the end cap and splice trays attached to the frame. Other express tubes remain uncut and will pass in a loop around the frame and back out the end cap.

The splice trays have splice organizers comprising splice holders for retaining splices that connect individual express fibers from the express tubes to drop cable fibers. The drop cable fibers are encased within transport tubes and lead to a drop cable that is sealed in an aperture in the end cap.

Coupler cassettes are also employed in fiber optic data and communications systems. A coupler cassette is a flat container for housing couplers, splice holders and slack areas for retaining slack optical fibers. A coupler joins one input optical fiber to two or more output optical fibers, thereby splitting the light being transmitted through a fiber into two or more fibers. In at least one instance, couplers have been utilized in connection with a splice closure of the type described above. In this instance, the individual couplers, splice holders, and fibers were all located in the coupler module. Locating the splice holders in the coupler module with the couplers, however, results in a complex and confusing splicing area.

SUMMARY OF THE INVENTION

The splice closure of the present invention includes a frame and an end cap on one end with apertures for the passage of fiber optic cables. At least one coupler cassette is removably mounted to the frame. The coupler cassette houses at least one coupler that connects an input optical fiber to a plurality of output optical fibers. At least one splice organizer comprising a plurality of splice holders is also carried by the frame exterior of the coupler cassette on the same splice tray. The splice holders retain splices of optical fibers leading to and from the coupler cassette. A housing encloses the frame, coupler cassette and splice organizer.

The splice closure preferably further has an optical fiber storage tray carried by the frame adjacent the splice organizer. The optical fiber storage tray stores unused optical fibers from the express tubes and drop cable tubes. Preferably the optical fiber storage tray is hinged so that it will move between a closed position overlying the splice organizer and an opened position exposing the splice organizer.

The coupler cassette and the splice organizer are preferably mounted on a main splice tray of the frame. In one embodiment, the main splice tray is generally planar and is affixed to the frame. In another embodiment, the main splice tray is removable from the frame and fits within a slot formed in the frame.

Preferably, a plurality of coupler cassettes will be utilized with each splice closure. The coupler cassettes may be stacked on one another in a subassembly. The coupler cassettes connect optical fibers such that one input optical fiber entering the coupler cassette subassembly results in a plurality of output optical fibers leaving the coupler cassette subassembly.

DETAILED DESCRIPTION OF THE INVENTION

Figure 1:
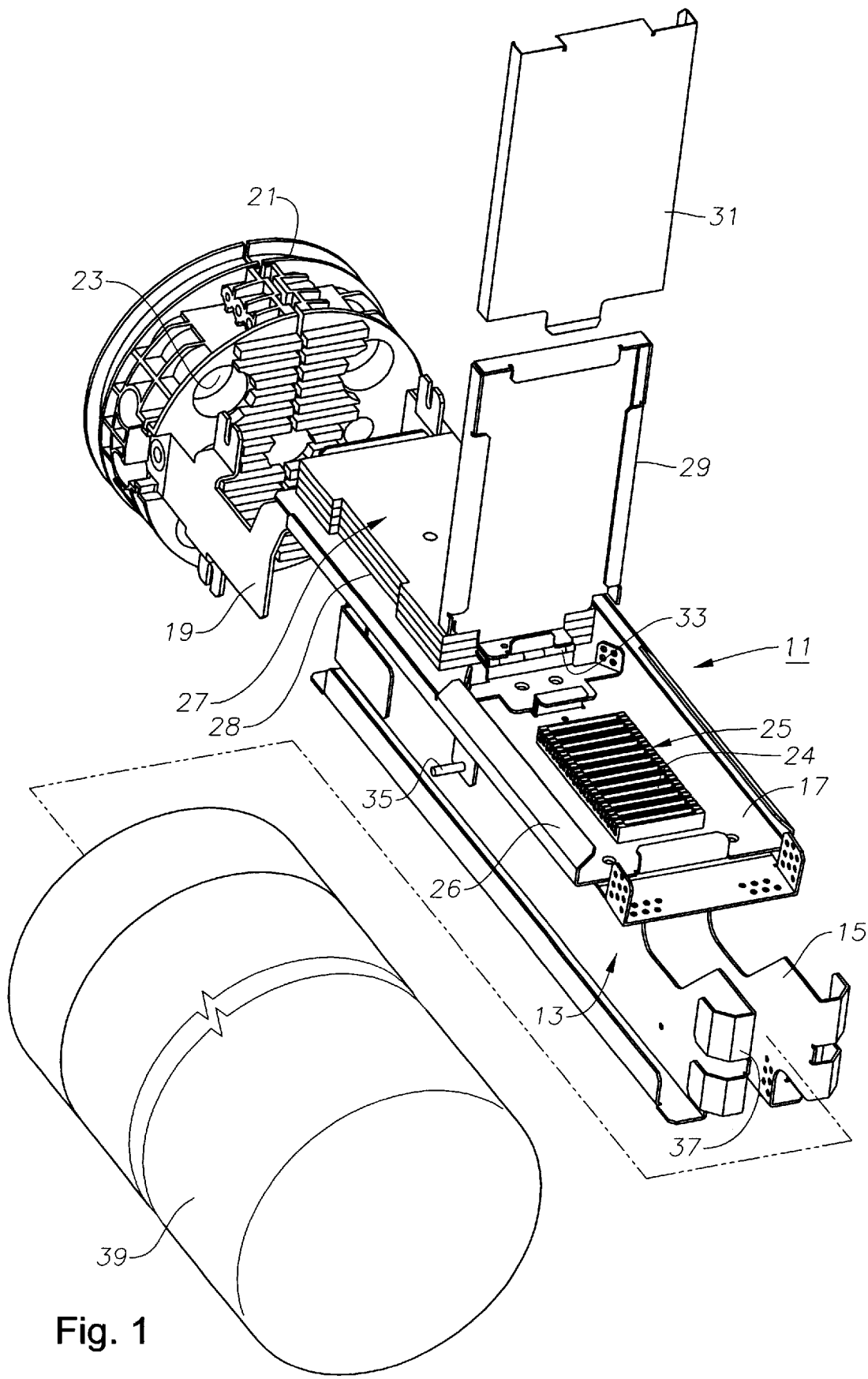
FIG. 1 is a perspective, partially exploded view of a splice closure constructed in accordance with the invention shown with the optical fiber storage tray in the opened position.

Referring to FIG. 1, a splice closure, indicated generally at 11, includes a frame 13 that extends along a longitudinal axis defined by the splice closure 11. Frame 13 has two side plates 15 that are spaced apart from each other, leaving a central cavity between them for receiving express fiber tubes (not shown). A main splice tray 17 is provided on the upper side of side plates 15. In the embodiment shown, main splice tray 17 is a flat plate that is perpendicular and rigidly attached to side plates 15 to form an integral structure. As shown, main splice tray 17 defines a generally planar platform. However, main splice tray 17 may have any convenient configuration. Two forward end brackets 19 extend from side plates 15 for fastening an end cap 21 to the frame 13. End cap 21 is a cylindrical member having a plurality of apertures 23 for receiving fiber optic cables (not shown) in a sealed arrangement with end cap 21.

Main splice tray 17 is divided into two approximately equal adjacent sections. A splice organizer 25 is located on one of the sections. Splice organizer 25 comprises a plurality of splice holders 24 for retaining fiber optic splices. Side walls 26 extend upwardly from the splice organizer section of main splice tray 17 to retain the optical fibers (not shown) entering and leaving the splice holders 24 of the splice organizer 25. A coupler cassette subassembly 27 is located on the remaining section of main splice tray 17. The positions of splice organizer 25 and coupler cassette subassembly 27 on main splice tray 17 are not critical to operability, and if desired, may be reversed. Splice organizer 25 and coupler cassette subassembly 27 may also be located on either side, or on both sides, of main splice tray 17. Coupler cassette subassembly 27 comprises a plurality of coupler cassettes 28 stacked one on another. The coupler cassettes 28 are arranged such that a single input optical fiber entering coupler cassette subassembly 27 will result in multiple output optical fibers leaving coupler cassette subassembly 27, as will be described.

Figure 2:
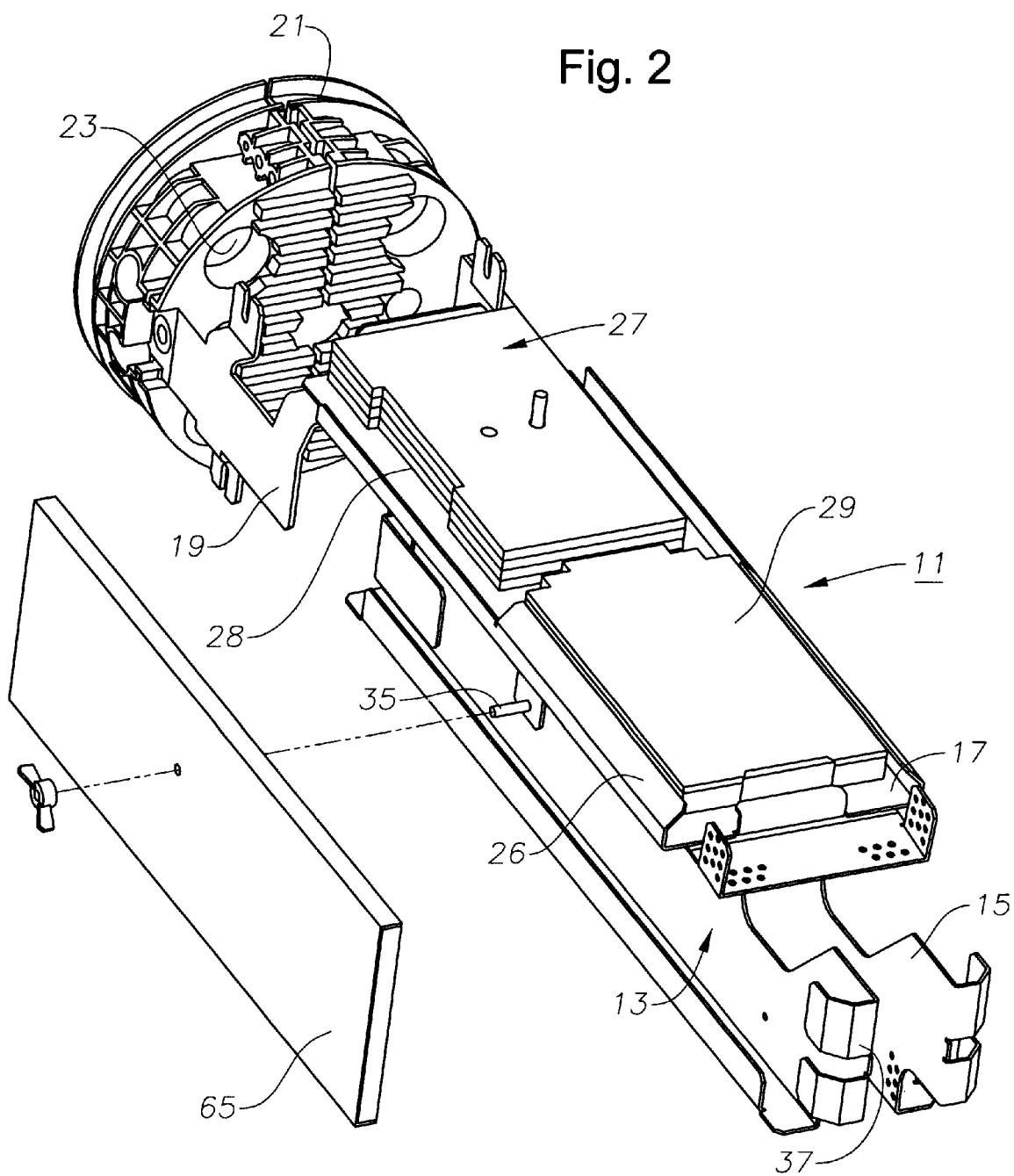
FIG. 2 is a perspective view of the splice closure of FIG. 1 shown with the optical fiber storage tray in the closed position.

An optical fiber storage tray 29 is located between splice organizer 25 and coupler cassette subassembly 27. In the embodiment shown, optical fiber storage tray 29 is a generally flat rectangular container having side walls that receive a lid 31 to form a rectangular enclosure. Lid 31 slides between an opened position shown in FIG. 1 and a closed position. Optical fiber storage tray 29 also has an opened and closed position relative to frame 13. A hinge 33 pivotally attaches optical fiber storage tray 29 to the platform defined by main splice tray 17. Hinge 33 allows optical fiber storage tray 29 to rotate between the opened position, shown in FIG. 1, exposing splice organizer 25, and the closed position, shown in FIG. 2, covering splice organizer 25. In the opened position, optical fiber storage tray 29 may be moved to a position that is generally perpendicular to the plane of the platform defined by main splice tray 17. In the closed position, optical fiber storage tray 29 is located in a plane that is generally parallel with the plane of the platform defined by main splice tray 17.

Frame 13 has a fastener 35 along one or both of the side plates 15 for retaining conventional splice trays (not shown) in a known manner. Fingers 37 at the rearward end of each side plate 15 serve to retain various fiber optic cables extending to and from end cap 21. A housing 39 will slide over frame 13 and fasten to end cap 21, thereby enclosing main splice tray 17.

Figure 3:
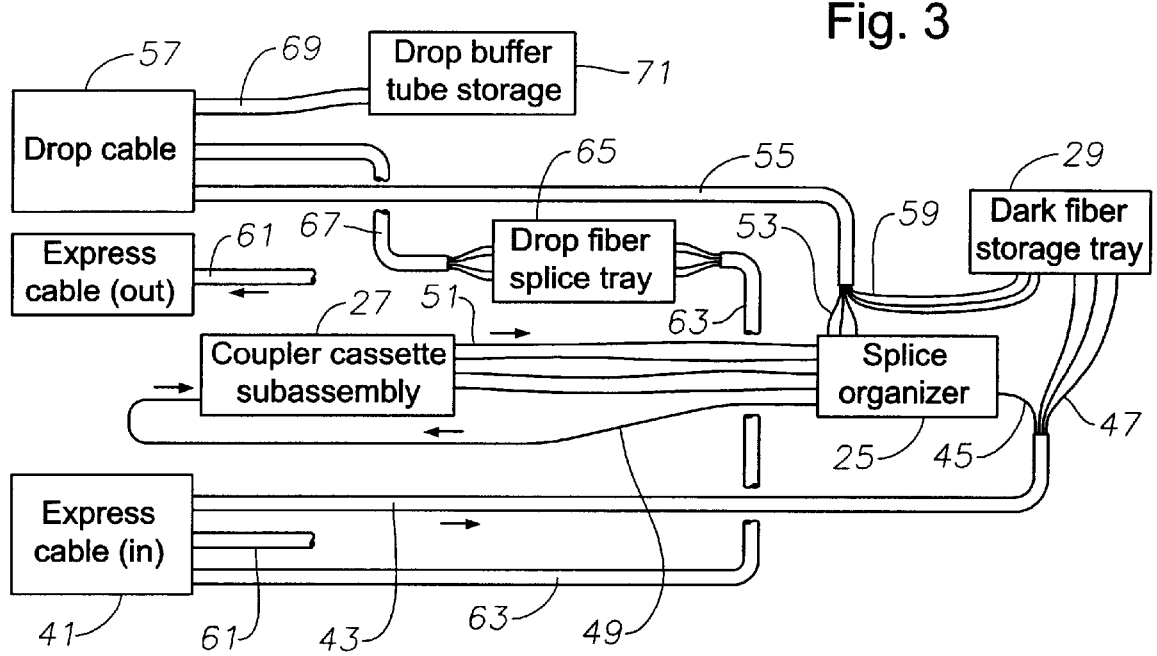
FIG. 3 is a schematic illustrating the routing of the optical fibers through the internal components of the splice closure of FIG. 1.

FIG. 3 illustrates a preferred routing for splice closure 11 of FIG. 1. An express cable 41 enters the splice closure 11 through one of the apertures 23 (FIG. 1), where it is sealed in a typical manner with the end cap 21. Express cable 41 contains a plurality of buffer or express tubes, each normally holding six to twelve individual optical fibers. Express buffer tube 43, which is one of the buffer tubes of express cable 41, will have at least one optical fiber 45 connected to one of the splice holders at splice organizer 25. The remaining express fibers 47 in express buffer tube 43 may be routed into optical fiber storage tray 29, where they are contained within the tray for subsequent use. A coupler input fiber 49 will be joined to express input fiber 45 at splice organizer 25. Input fiber 49 is routed to coupler cassette subassembly 27, which eventually results in a plurality of output fibers 51. Output fibers 51 lead back to splice organizer 25, where they are spliced to individual drop cable fibers 53. Drop cable fibers 53 are contained within a buffer tube 55 that leads back to a drop cable 57. Drop cable 57 is sealed with end cap 21 and exits the splice closure 11 through one of the apertures 23 of end cap 21. There may be additional unused drop cable fibers 59, which also may be stored in optical fiber storage tray 29.

Additionally, express cable 41 will typically have uncut express tubes 61 (only a portion of one shown) that are routed in a loop through the generally hollow central portion of frame 13 between side plates 15 and back out of splice closure 11 through another aperture 23 of end cap 21. Also, express cable 41 may have express tubes 63 (only one shown) that are not connected to coupler cassette subassembly 27, but instead have optical fibers that are individually joined in one-to-one splices with optical fibers of drop cable 57. The splices of individual express fibers from express tube 63 to fibers of a drop buffer tube 67 occur in one or more drop fiber splice trays 65. Splice trays 65 are normally mounted to side plates 15 by fasteners 35 (FIG. 1). Furthermore, there may be excess drop buffer tubes 69 that are not utilized, but instead are stored in a drop buffer tube storage area 71 located on the exterior of side plate 15 (FIG. 1).

Figure 4:
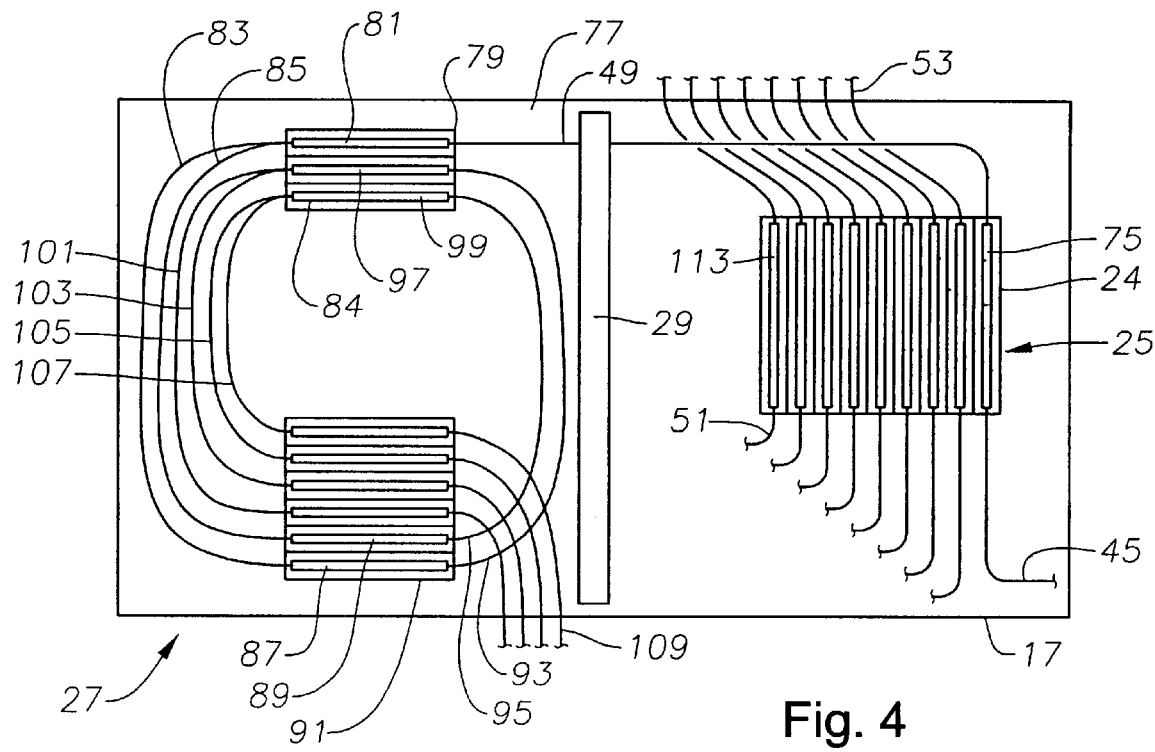
FIG. 4 is a partially schematic top view of one of the coupler cassettes and the splice organizer of the splice closure of FIG. 1.

Referring to FIG. 4, main splice tray 17 is shown enlarged. As previously mentioned, splice organizer 25 comprises a plurality of splice holders 24. Splice holders 24 preferably are elongated strips of a flexible material, such as soft plastic, defining narrow slots therebetween. Typically, two splices 75 will be located within each of the slots between splice holders 24. The first splice 75 connects express fiber 45 to coupler input fiber 49, which is the input optical fiber to coupler cassette subassembly 27. Coupler cassette subassembly 27 preferably has a plurality of coupler cassettes 28 stacked one on another, with only one shown in FIG. 4. The coupler cassettes 28 are secured to main splice tray 17 by fasteners (not shown).

First coupler cassette 77, shown in FIG. 4, is the coupler cassette 28 within coupler cassette subassembly 27 that receives input fiber 49. First coupler cassette 77 is a rectangular, thin, enclosure having a lid (shown removed) that encloses and protects the optical fibers connections therein. The other coupler cassettes 28 within subassembly 27 will be substantially identical. First coupler cassette 77 has a coupler organizer 79, which has coupler holders 84 similar to splice holders 24 of splice organizer 25. A first coupler 81 is retained within one of the slots of coupler organizer 79. First coupler 81 is of a conventional type that joins two or more output optical fibers 83, 85 to one input optical fiber, such as input optical fiber 49. First coupler 81 may be arranged to deliver 50% of the optical information within input fiber 49 to each output fiber 83, 85 or different fractions of light may be shared between output fibers 83, 85.

Output fibers 83, 85 lead to first and second splices 87, 89 within first coupler cassette 77. First and second splices 87, 89 are located within a splice organizer 91. Splice organizer 91 is similar to splice organizer 25, having a plurality of parallel resilient strips that frictionally hold splices between them. First and second splices 87, 89 are connected respectively to output optical fibers 93, 95 to become the input optical fibers to second and third couplers 97, 99, respectively. Second and third couplers 97, 99 are also retained within coupler organizer 79 alongside first coupler 81. The output fibers 101, 103 of second coupler 97 lead to two additional splices in splice organizer 91 and from there to two output optical fibers 109. Similarly, output fibers 105, 107 of third coupler 99 are spliced to two additional output fibers 109 in splice organizer 91. The output fibers 109 lead to other coupler cassettes 28 within coupler cassette subassembly 27, each receiving an input optical fiber resulting in multiple output optical fibers.

The output optical fibers 51 of coupler cassette subassembly 27 lead back to splices in splice organizer 25. In the embodiment shown and described herein, there are four additional coupler cassettes 28, each identical to first coupler cassette 77, resulting in a total of sixteen output fibers 51 (only eight shown in FIG. 4, only our shown in FIG. 3). Each individual output fiber 51 is connected by a splice 113 to one of the drop cable fibers 53 of drop cable 57.

Figure 5:
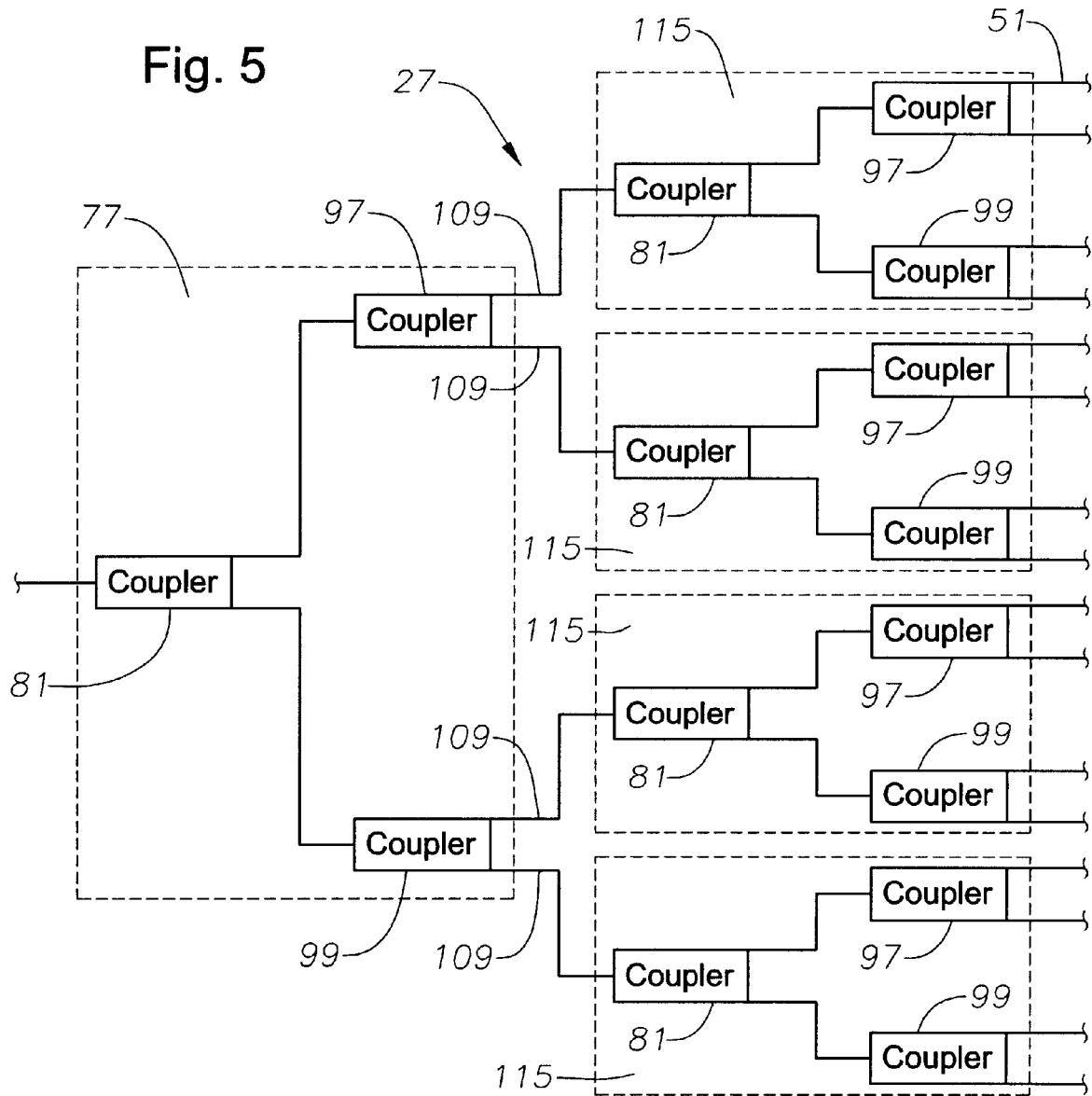
FIG. 5 is a schematic view illustrating the connection of a plurality of coupler cassettes utilized with the splice closure of FIG. 1.

A schematic of the routing of coupler cassette subassembly 27 is shown in FIG. 5. Each of the four output fibers 109 of first coupler cassette 77 leads to another coupler cassette 115, of which there are a total of four. Each of the coupler cassettes 115 has three couplers just as first, second and third couplers 81, 97, 99 of first coupler cassette 77. As a result, coupler cassette subassembly 27 produces a total of sixteen output fibers 51.

In use, coupler cassettes 77 and 115 are preferably assembled at a factory with the couplers 81, 97, 99, as shown in FIGS. 4 and 5. The individual coupler cassettes 115 are then assembled into coupler cassette subassembly 27 so that a single input optical fiber results in multiple, and in particular sixteen, output optical fibers. In the field, the craftsperson will install express cable 41 and drop cable 57 in the apertures 23 of end cap 21. For the optical fibers that will be connected to couplers, the craftsperson connects one express fiber 45 (FIG. 4) to coupler input fiber 49 leading to first coupler cassette 77 of cassette coupler subassembly 27. The craftsperson does this by forming a splice 75 in splice organizer 25, as shown in FIG. 4. The craftsperson then connects each output fiber 51 from coupler cassette subassembly 27 to one of the drop cable fibers 53 by forming a splice 113, as shown in FIG. 4. Additionally, the craftsperson may connect optical fibers from express tube 63 (FIG. 3), to optical fibers of drop buffer tube 67 using additional splice trays 65 in a conventional manner.

Unused express fibers 47 from express buffer tube 43 will be placed within optical fiber storage tray 29. Unused fibers 59 from drop tube 55 may be also placed in optical fiber storage tray 29. After completion, lid 31 of optical fiber storage tray 29 is placed in a closed position and optical fiber storage tray 29 is rotated to the closed position shown in FIG. 2 overlying splice organizer 25. If there are any excess drop buffer tubes 69, these are stored beneath the additional splice trays 65 between the side plates 15 (FIG. 1). After completion, the craftsperson will slide housing 39 over frame 13 and secure it to end cap 21.

Figure 6:
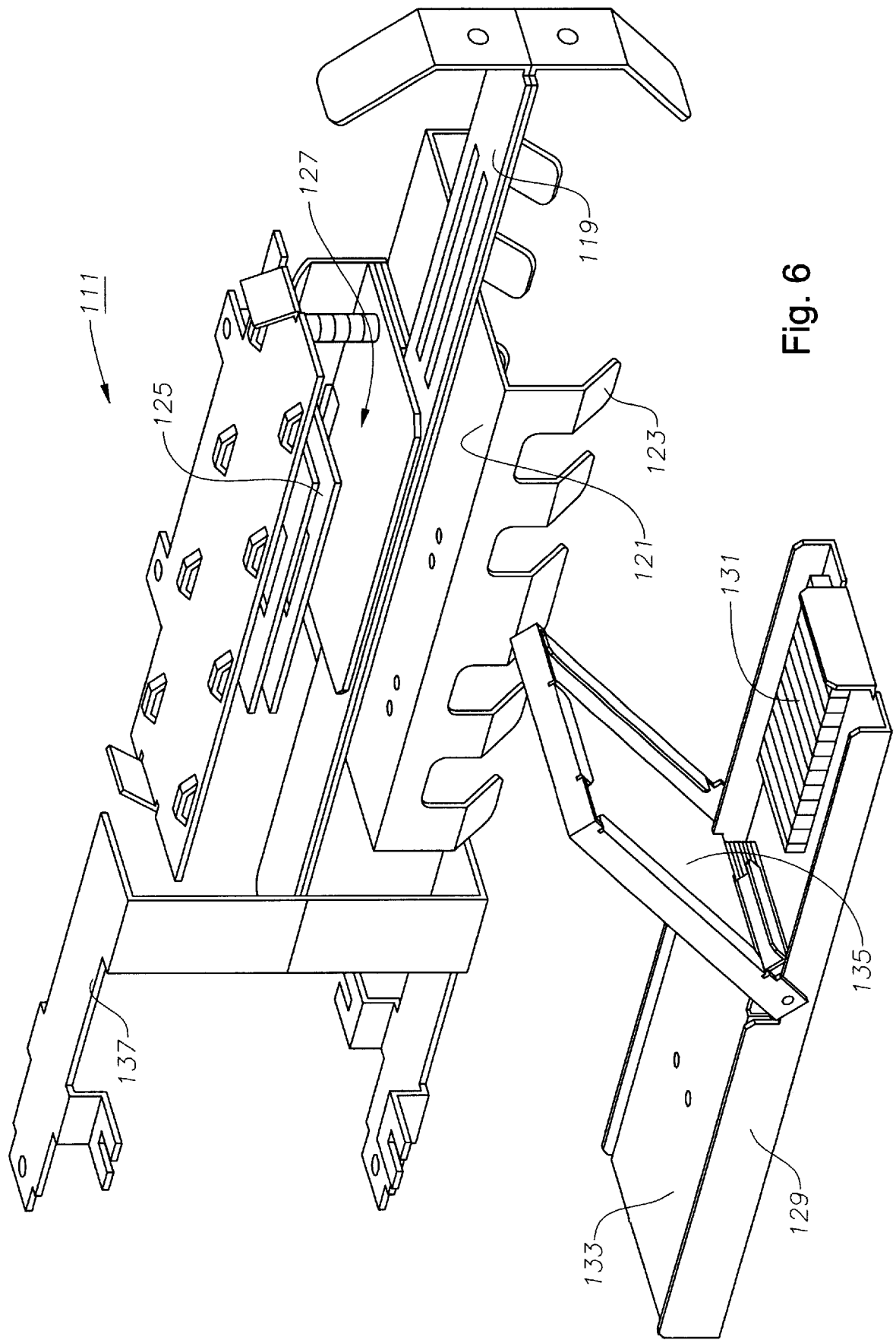
FIG. 6 is an exploded view of an alternate embodiment of a splice closure constructed in accordance with the invention shown with the optical fiber storage tray in the opened position and the main splice tray removed from the frame.
Figure 7:
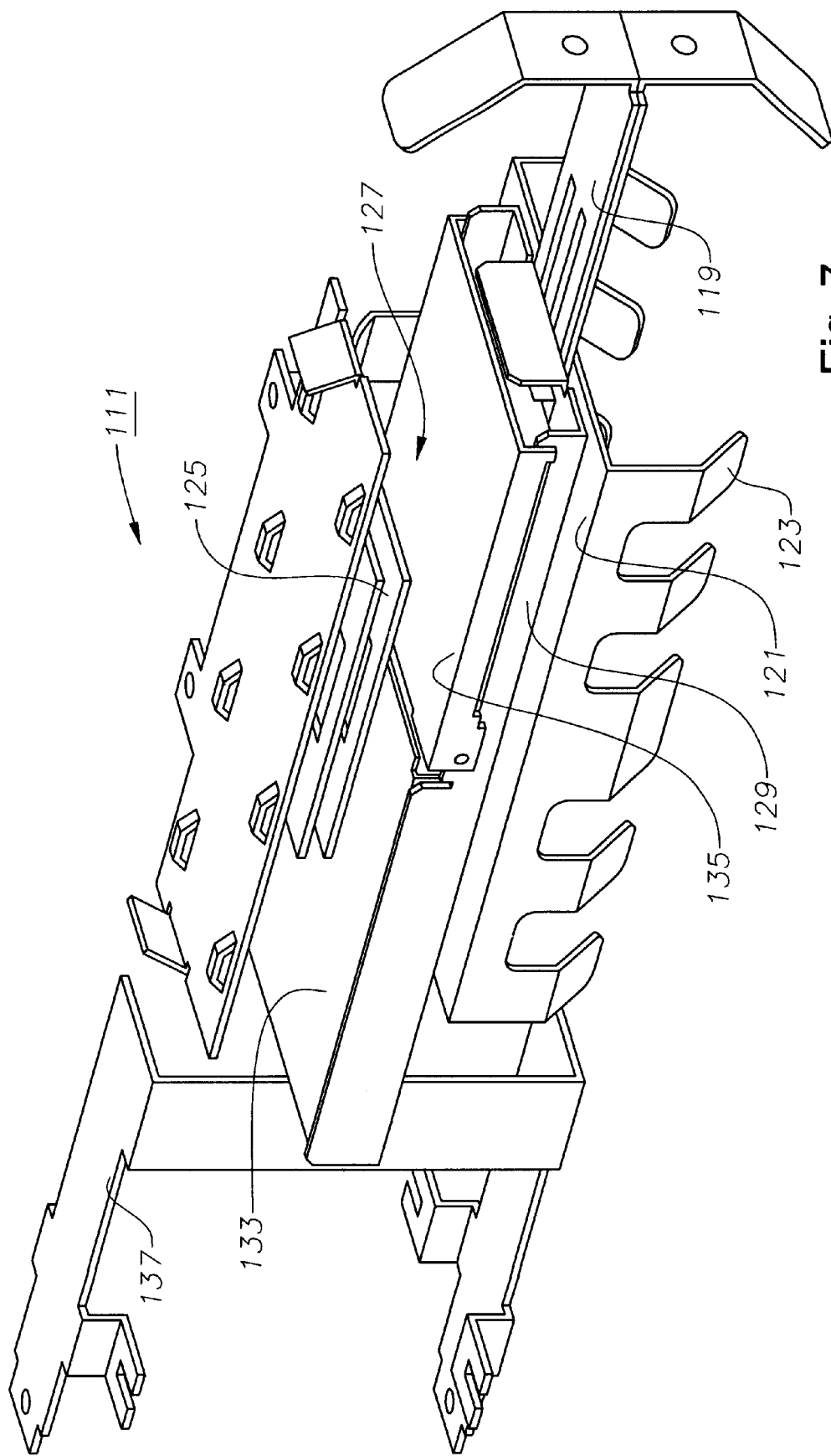
FIG. 7 is a perspective view of the splice closure of FIG. 6 shown with the main splice tray installed within a slot provided in the frame.

FIGS. 6 and 7 show an alternate embodiment of a splice closure 111 constructed in accordance with the invention. Frame 119 has a plate 121 with a plurality of fingers 123 for retaining fiber optic cables. A plurality of dividers 125 are mounted above plate 121. Dividers 125 are located in a plane parallel to the plane containing plate 121. Dividers 125 are used for holding additional splice trays (not shown) of the same type as splice trays 65 of splice closure 11 previously described. A rectangular slot 127 is located between dividers 125 and plate 121.

A main splice tray 129 fits within slot 127, as shown in FIG. 7. Main splice tray 129 is of the same general structure as main splice tray 17 of splice closure 11 shown in FIG. 1, except that it is removable from frame 119. Main splice tray 129 has a splice organizer 131 adjacent one end and a coupler cassette subassembly 133 adjacent the other end. An optical fiber storage tray 135 is secured by a hinge between splice organizer 131 and coupler cassette subassembly 133. Optical fiber storage tray 135 will move between an opened position shown in FIG. 6 and a closed position shown in FIG. 7. Optical fiber storage tray 135 has the same structure as optical fiber storage tray 29 (FIG. 1) of splice closure 11, including the lid 31 (not shown), previously described. Frame 119 also has brackets 137 for securing frame 119 to an end cap (not shown). A housing will enclose frame 119 in the same manner as housing 39 of splice closure 11 (FIG. 1) previously described. The splice closure 111 of FIGS. 6 and 7 is installed and used in the same manner as splice closure 11. In either embodiment, the coupler cassette subassembly 27, 133 can be mounted on both sides of the frame 13, 119, thereby providing a total of two coupler cassette subassemblies 27, 133 in each splice closure 11, 111.

The invention has significant advantages. A splice closure according to the invention having a main splice tray provides a convenient and organized location within the closure for coupler cassettes and a splice organizer. The use of a pre-installed coupler cassette subassembly allows a craftsperson in the field to easily and quickly connect the express and drop cables. The splice closure also enables conventional splices between the optical fibers of express tubes and drop tubes.

While the invention has been shown in only two of its forms, it should be apparent to those skilled in the art that it is not so limited, and thus, is susceptible to various changes without departing from the scope of the invention.

We claim:

1. A fiber optic splice closure comprising:
   a frame;
   an end cap at one end of the frame having apertures for the passage of a plurality of express cable optical fibers and a plurality of drop cable optical fibers;
   a plurality of coupler cassettes carried by the frame in a coupler cassette subassembly, each of the coupler cassettes containing at least one coupler, the plurality of coupler cassettes connecting optical fibers such that an input optical fiber to the subassembly results in a plurality of output optical fibers from the subassembly;
   a splice organizer carried by the frame and exterior of the coupler cassettes, the splice organizer comprising at least one splice holder for retaining a splice between at least one of the incoming express cable optical fibers and the input optical fiber to the subassembly and for retaining a splice between at least one of the drop cable optical fibers and at least one of the plurality of output optical fibers from the subassembly; and
   a housing attached to the end cap.

2. The splice closure according to claim 1, further comprising:
   an optical fiber storage tray carried by the frame adjacent the splice organizer for storing optical fibers that are not spliced to the optical fibers leading from and to the coupler cassettes.

3. The apparatus according to claim 1, further comprising:
   an optical fiber storage tray carried by the frame adjacent the splice organizer for storing optical fibers, the optical fiber storage tray being mounted by a hinge and movable between a closed position overlying the splice organizer and an open position exposing the splice organizer.

4. The splice closure according to claim 1, further comprising:
   an optical fiber storage tray carried by the frame adjacent the splice organizer for storing optical fibers, the optical fiber storage tray having a lid for opening and closing the tray, the optical fiber storage tray being mounted by a hinge and movable between a closed position overlying the splice organizer and an open position exposing the splice organizer.

5. The splice closure according to claim 1, further comprising:
   a main splice tray defining a generally planar platform on which the coupler cassettes and the splice organizer are mounted.

6. The splice closure according to claim 1, further comprising:
   a main splice tray forming a fixed part of the frame, the coupler cassettes and the splice organizer being mounted to the main tray.

7. The splice closure according to claim 1, further comprising:
   a slot defined by the frame; and
   a main splice tray on which the coupler cassettes and the splice organizer are mounted, the main splice tray being removably carried in the slot.

8. The splice closure according to claim 1, wherein the coupler cassettes of the subassembly are stacked one on another.

9. A splice closure comprising:

a frame;

an end cap at one end of the frame having apertures for the passage of optical fibers;

a main splice tray carried by the frame;

a plurality of coupler cassettes mounted to the main splice tray in an array overlying one another, each of the coupler cassettes housing at least one coupler for connecting a single input optical fiber entering the array to multiple output optical fibers leaving the array;

a splice organizer carried by the main splice tray adjacent the array of coupler cassettes, the splice organizer comprising a plurality of splice holders for retaining splices to and from the array;

an optical fiber storage tray mounted to the main splice tray adjacent the splice organizer for storing optical fibers, the optical fiber storage tray being mounted to the main splice tray by a hinge and movable between a closed position overlying the splice organizer and an open position exposing the splice organizer, and a housing attached to the end cap.

10. The splice closure according to claim 9, further comprising:

a lid removably attached to the optical fiber storage tray for opening and closing the optical fiber storage tray.

11. The splice closure according to claim 9, further comprising:

a slot defined by the frame; and wherein the main splice tray on which the coupler cassettes and the splice organizer are mounted is removably carried in the slot.

12. The splice closure according to claim 9, wherein the main splice tray defines a generally planar platform such that the coupler cassettes and the splice organizer are located on the same splice tray within the splice closure.

13. A method for connecting a plurality of drop cable optical fibers to an express cable optical fiber in a splice closure, the method comprising the steps of:

(a) mounting at least one coupler connecting an input optical fiber to multiple output optical fibers in each of a plurality of coupler cassettes and connecting the couplers cassettes together into a subassembly so that each of the output optical fibers of one of idle coupler cassettes defines the input optical fiber of one of the other coupler cassettes;

(b) mounting the coupler cassette to a main splice tray positioned on a frame within the splice closure;

(c) splicing the express optical fiber to the input optical fiber and splicing the drop cable optical fibers to the output optical fibers; and (d) enclosing the frame, coupler cassette and main splice tray.

14. A fiber optic splice closure comprising:

a frame;

an end cap at one end of the frame having apertures for the passage of optical fibers;

at least one coupler cassette carried by the frame, the coupler cassette containing at least one coupler that has an input optical fiber connected to a plurality of output optical fibers;

a splice organizer carried by the flame and exterior of the coupler cassette, the splice organizer comprising a plurality of splice holders for retaining splices of optical fibers to and from the coupler cassette;

an optical fiber storage tray carried by the fame adjacent the splice organizer for storing optical fibers, the optical fiber storage tray being mounted by a hinge and movable between a closed position overlying the splice organizer and an open position exposing the splice organizer; and a housing attached to the end cap.

15. The splice closure according to claim 14, further comprising:

a main splice tray defining a generally planar platform on which the coupler cassette and the splice organizer are mounted.

16. The splice closure according to claim 14, further comprising:

a main splice tray forming a fixed part of the frame, the coupler cassette and the splice organizer being mounted to the main splice tray.

17. A fiber optic splice closure comprising:

a frame;

an end cap at one end of the frame having apertures for the passage of optical fibers;

at least one coupler cassette carried by the frame, the coupler cassette containing at least one coupler that has an input optical fiber connected to a plurality of output optical fibers;

a splice organizer carried by the frame and exterior of the coupler cassette, the splice organizer comprising a plurality of splice holders for retaining splices of optical fibers to and from the coupler cassette;

an optical fiber storage tray carried by the frame adjacent the splice organizer for storing optical fibers, the optical fiber storage tray having a lid for opening and closing the tray, the optical fiber storage tray being mounted by a hinge and movable between a closed position overlying the splice organizer and an open position exposing the splice organizer, and a housing attached to the end cap.

18. The splice closure according to claim 17, further comprising:

a main splice tray defining a generally planar platform on which the coupler cassette and the splice organizer are mounted.

19. The splice closure according to claim 17, further comprising:

a main splice tray forming a fixed part of the fame, the coupler cassette and the splice organizer being mounted to the main splice tray.

20. A fiber optic splice closure comprising:

a frame defining a slot;

an end cap at one end of the frame having apertures for the passage of optical fibers;

at least one coupler cassette carried by the frame, the coupler cassette containing at least one coupler that has an input optical fiber connected to a plurality of output optical fibers;

a splice organizer carried by the frame and exterior of the coupler cassette, the splice organizer comprising a plurality of splice holders for retaining splices of optical fibers to and from the coupler cassette;

a main splice tray on which the coupler cassette and the splice organizer are mounted, the main splice tray being removably carried in the slot; and a housing attached to the end cap.

* * * * *